(12) United States Patent
Koike

(10) Patent No.: US 8,706,174 B2
(45) Date of Patent: Apr. 22, 2014

(54) PORTABLE ELECTRONIC APPARATUS

(75) Inventor: Satoshi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/519,204

(22) PCT Filed: Nov. 19, 2010

(86) PCT No.: PCT/JP2010/006789
§ 371 (c)(1),
(2), (4) Date: Jun. 26, 2012

(87) PCT Pub. No.: WO2011/092776
PCT Pub. Date: Aug. 4, 2011

(65) Prior Publication Data
US 2012/0282983 A1   Nov. 8, 2012

(30) Foreign Application Priority Data

Jan. 28, 2010   (JP) .................... 2010-017022

(51) Int. Cl.
*H04M 1/00*   (2006.01)
*H04B 1/38*   (2006.01)
*H04M 1/02*   (2006.01)
*H04M 1/23*   (2006.01)

(52) U.S. Cl.
CPC .............. *H04M 1/0214* (2013.01); *H04M 1/23* (2013.01)
USPC ...................... 455/575.3; 455/90.3

(58) Field of Classification Search
CPC ........ H04M 1/0214; H04M 1/04; H04M 1/23
USPC ............ 455/575.3, 550.1, 575.1, 575.4, 90.3; 361/679.05, 679.06
See application file for complete search history.

(56) References Cited

U.S. PATENT DOCUMENTS

| 6,539,208 B1 | 3/2003 | Mori | |
|---|---|---|---|
| 6,542,721 B2 * | 4/2003 | Boesen | ....................... 455/553.1 |
| 6,665,175 B1 * | 12/2003 | deBoer et al. | ............ 361/679.06 |

(Continued)

FOREIGN PATENT DOCUMENTS

| JP | 05-333960 | 12/1993 |
|---|---|---|
| JP | 2001-144836 | 5/2001 |

(Continued)

OTHER PUBLICATIONS

International Search Report PCT/JP2010/006789 dated Feb. 15, 2011, with English translation.

*Primary Examiner* — Sonny Trinh
(74) *Attorney, Agent, or Firm* — Young & Thompson

(57) ABSTRACT

An object is to provide a portable electronic apparatus that improves operability of a person who operates the portable electronic apparatus. The portable electronic apparatus includes a screen unit 1, an operation unit 2, a U-shaped bridge unit 3 that is connected to the operation unit 2 so as to be able to fold the screen unit 1 and the operation unit 2 to face each other, and an anchor unit 4 that anchors the screen unit 1 to the bridge unit 3 while stopping rotation of the screen unit 1, in which the screen unit 1 is connected to the bridge unit 3 so that the screen unit 1 rotates around an axis that is in a generally same direction as a fold axis for the operation unit 2 and the bridge unit 3.

4 Claims, 14 Drawing Sheets

(56) References Cited

U.S. PATENT DOCUMENTS

| | | | |
|---|---|---|---|
| 6,842,627 B2 * | 1/2005 | Harsu et al. | 455/550.1 |
| 6,892,082 B2 * | 5/2005 | Boesen | 455/575.3 |
| 7,158,634 B2 * | 1/2007 | Eromaki | 379/433.13 |
| 7,549,246 B2 * | 6/2009 | Kuo | 40/601 |
| 7,566,033 B2 * | 7/2009 | Schwager et al. | 248/125.9 |
| 7,599,181 B2 * | 10/2009 | Chuang et al. | 361/679.55 |
| 8,073,502 B2 * | 12/2011 | Malthe et al. | 455/575.1 |
| 8,289,685 B2 * | 10/2012 | Li et al. | 361/679.26 |
| 2003/0125081 A1 * | 7/2003 | Boesen | 455/556 |
| 2009/0005130 A1 | 1/2009 | Ishikura et al. | |

FOREIGN PATENT DOCUMENTS

| | | |
|---|---|---|
| JP | 2003-298695 | 10/2003 |
| JP | 2005-303926 | 10/2005 |
| JP | 2006-270836 | 10/2006 |
| JP | 2008-294375 | 12/2008 |
| JP | 2009-081704 | 4/2009 |
| WO | 2005053288 | 6/2005 |

* cited by examiner

PORTABLE ELECTRONIC APPARATUS

TECHNICAL FIELD

The present invention relates to a portable electronic apparatus, and particularly to a foldable portable electronic apparatus.

BACKGROUND ART

In recent years, there are many mobile phone terminals with a foldable form being sold in order to realize protection and enlargement of a display screen and prevention of malfunction in the mobile phone terminal at the time of not using the mobile phone terminal. Moreover, a digital camera function and a television function are incorporated to many mobile phone terminals by multi-functionalization of the mobile phone terminal. In this case, the mobile phone terminal that can be folded with a display screen on the front has been developed for purposes such as improvement in the operability as a digital camera, television viewing or using the display screen as a touch panel in the state that the mobile phone terminal is folded.

An example of mounting the display screen and an operation button on separate housings is explained using the following PTLs 1 and 2.

PTL 1 discloses a configuration of a mobile telephone set body with a key and a mobile telephone set with a display unit that is slidably stored to the mobile telephone set.

PTL 2 discloses a configuration of a mobile telephone set that opens and closes an upper housing with a liquid crystal display screen and a lower housing with an operation button and the like using a slide mechanism, and an antenna expands and contracts by a movement of the upper housing.

Although in the mobile telephone set disclosed in PTLs 1 and 2, the display screen and the operation button are mounted on separate housings, a form to fold the display screen is not mentioned. Therefore, a configuration example of a mobile phone terminal that enables folding with the display screen on the front is explained using PTL 3 below.

PTL 3 discloses a foldable mobile phone terminal to which a display unit is rotatably connected. The display unit of the foldable mobile phone terminal disclosed in PTL 3 is connected to a U-shaped coupling member that surrounds the circumference of the display unit. In the U-shaped coupling member, a stopper rib is provided at the connection point with the display unit so that the display unit does not rotate 180 degrees or more. Further, the U-shaped coupling member includes a movable axis and an anchor axis, and the display unit can be anchored by locking the movable axis.

CITATION LIST

Patent Literature

PTL 1: Japanese Unexamined Patent Application Publication No. 2001-144836
PTL 2: Japanese Unexamined Patent Application Publication No. 2003-298695
PTL 3: Japanese Unexamined Patent Application Publication No. 5-333960

SUMMARY OF INVENTION

Technical Problem

However, when the foldable mobile phone terminal disclosed in PTL 3 is used, the following problem is generated. When the display unit of the foldable mobile phone terminal is rotated, the display unit is stopped at the 180 degrees rotated state by an action of the stopper rib, and after that, the movable axis of the U-shaped connecting member must be slided to anchor the display unit. Moreover, in the case of folding with the display unit on the front, as described above, after the display unit is rotated, the display unit must be anchored to the U-shaped coupling member, and then a folding operation must be performed. In this way, the operation of stopping the rotated display unit, the operation of anchoring the display unit, and the operation of folding the mobile phone terminal are respectively independent. Therefore, there has been a problem that a person who operates the mobile phone terminal feels troublesome in the operation of rotating the display unit and folding with the display unit on the front.

The present invention is made in order to solve such a problem, and an object is to provide a portable electronic apparatus that improves the operability of the person who operates the portable electronic apparatus.

Solution to Problem

An exemplary aspect of the present invention is a portable electronic apparatus that includes a generally rectangular first housing, a generally rectangular second housing, a U-shaped bridge unit that rotatably connects the second housing and is connected to the first housing so that the second housing and the first housing can be folded to face each other, and an anchor unit that anchors the second housing to the bridge unit while stopping rotation of the second housing, in which the second housing is connected to the bridge unit so as to rotate around an axis that is in a generally same direction as a fold axis for the first housing and the bridge unit.

Advantageous Effects of Invention

The present invention can provide a portable communication apparatus that improves the operability of a person who operates a portable electronic apparatus.

DESCRIPTION OF EMBODIMENTS

First Exemplary Embodiment

Figure 1:
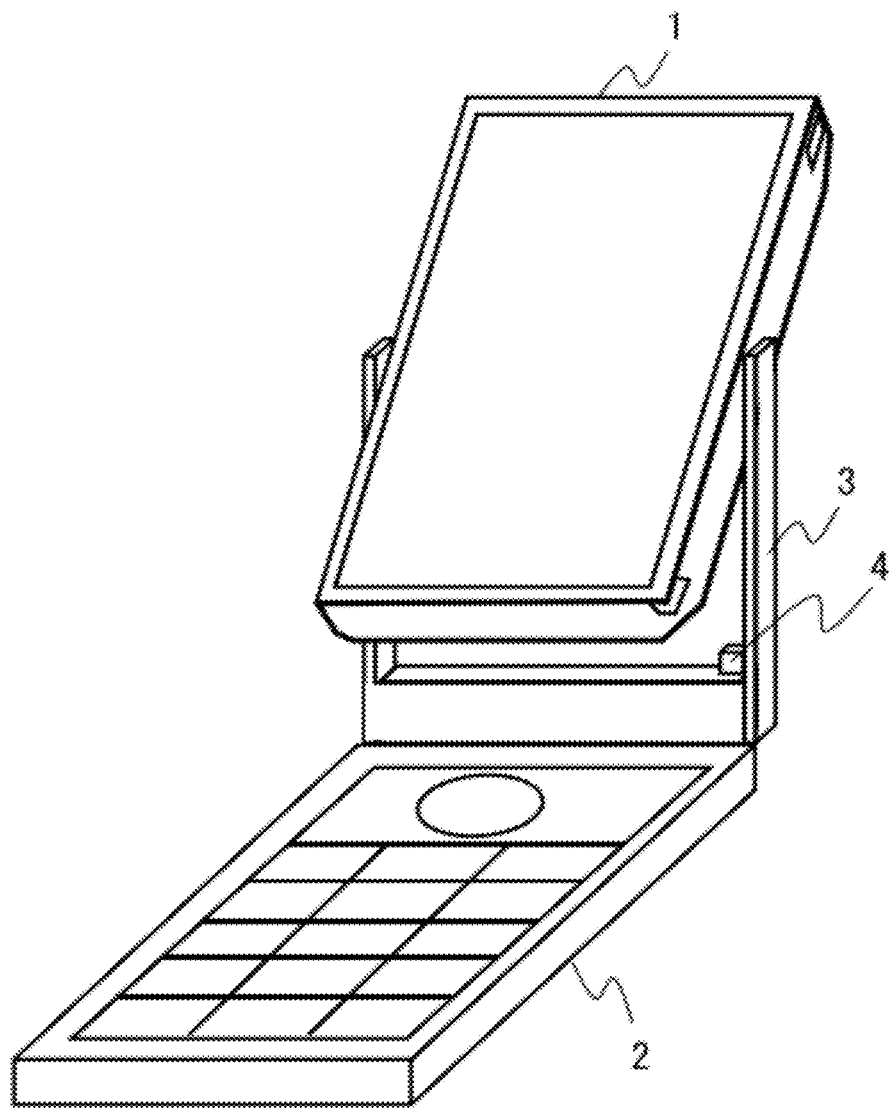
FIG. 1 is a block diagram of a mobile phone terminal according to a first exemplary embodiment.

Hereinafter, exemplary embodiments of the present invention are described with reference to the drawings. A configuration example of a portable electronic apparatus according to a first exemplary embodiment of the present invention is explained using FIG. 1. The portable electronic apparatus may be a communication terminal such as a mobile phone terminal, a PDA (Personal Digital Assistant) terminal, and a PHS (Personal Handy-phone System) terminal, and may be an electronic dictionary, a game terminal, and the like. A mobile phone terminal is explained below as an example of the portable electronic apparatus. The mobile phone terminal includes a screen unit 1, an operation unit 2, a bridge unit 3, and an anchor unit 4.

The screen unit 1 is composed of a generally rectangular housing including a liquid crystal display screen. The liquid crystal display screen is disposed on one of a surface and a back surface of the housing. Otherwise, the liquid crystal display may be disposed on the surface and the back surface. The screen unit 1 is rotatably connected to the bridge unit 3. The bridge unit 3 is formed in a U-shape. The screen unit 1 can be rotated around the connection part between the bridge unit 3 and the screen unit 1. Note that in this drawing, although both side surfaces of the screen unit 1 are connected to the bridge unit 3, only one of the surfaces may be connected to the bridge unit 3.

The operation unit 2 is composed of a generally rectangular housing including the operation button. The operation button may be a button with physical convexity and concavity and it may be a touch panel that displays the button on the liquid crystal display. The operation unit 2 is connected to the bridge unit 3 using a hinge, and the operation unit 2 and the bridge unit 3 can be folded. At the time of folding, the screen unit 1 connected to the bridge unit 3 and the operation unit 2 are folded to face each other. That is, the surface including the operation button of the operation unit 2 and the surface or the back surface of the screen unit 1 are folded to face each other.

Moreover, the screen unit 1 is connected to the bridge unit 3 so that the screen unit 1 rotates around an axis in the generally same direction as a fold axis for the operation unit 2 and the bridge unit 3. When a line connecting the connection part between the screen unit 1 and the bridge unit 3 is a rotation axis, the screen unit 1 is connected to the bridge unit 3 so that the rotation axis is generally parallel to the fold axis for the operation unit 2 and the bridge unit 3. As for the screen unit 1, the anchor unit 4 provided to the bridge unit 3 stops the rotation thereof and also anchors the screen unit 1 to the bridge unit 3.

Figure 2:
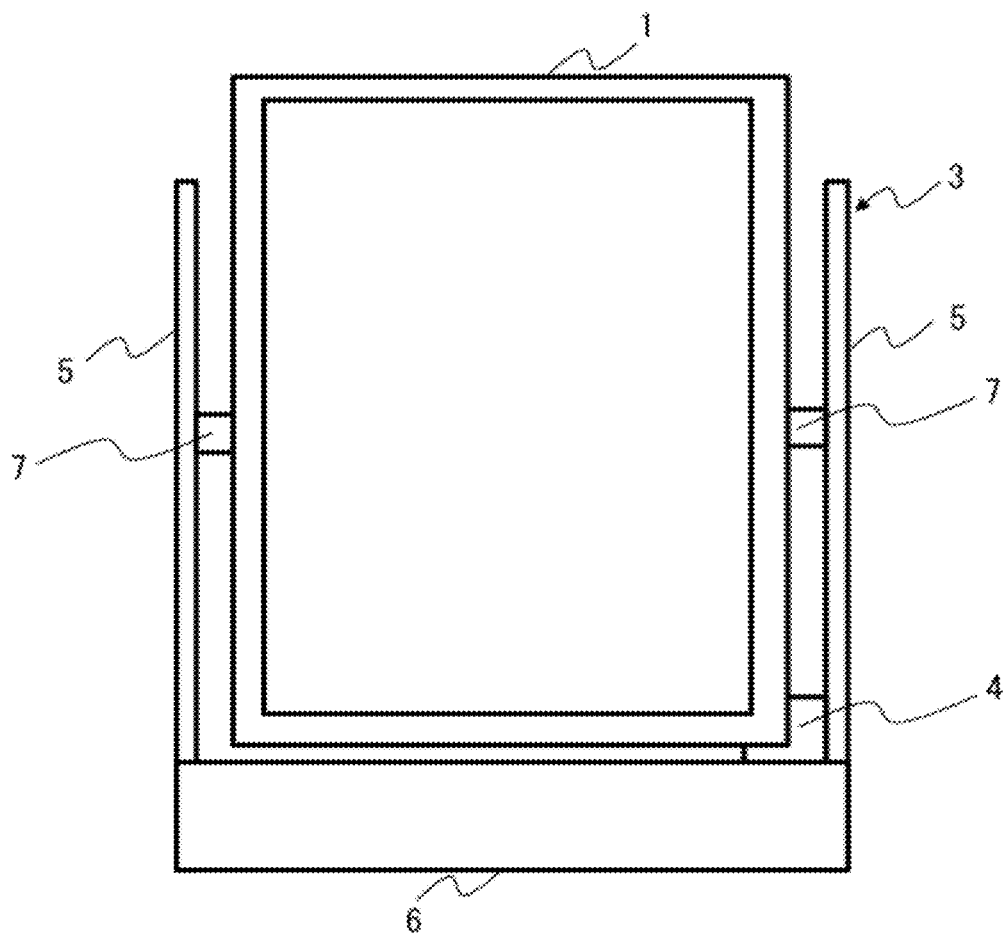
FIG. 2 is a block diagram of a bridge unit according to the first exemplary embodiment.

Next, a configuration example of the bridge unit 3 according to the first exemplary embodiment of the present invention is explained using FIG. 2. The bridge unit 3 includes a support unit 5, a connection unit 6, and a rotation axis unit 7. The anchor unit 4 is disposed on the upper right corner of the connection unit 6.

The support units 5 are disposed to face each other with the screen unit 1 interposed therebetween. The rotation axis unit 7 is disposed between the screen unit 1 and the support unit 5, and connected to the screen unit 1 and the support unit 5. The rotation axis unit 7 is connected to a generally central part of a side surface of the screen unit 1. The screen unit 1 is rotated by the connected rotation axis unit 7. The support unit 5 and the rotation axis unit 7 may be integrally formed. As shown in FIG. 2, the support unit 5 and the rotation axis unit 7 may be disposed to face each other with the screen unit 1 interposed therebetween or may be disposed only on the position that faces one side surface of the screen unit 1. When the support unit 5 and the rotation axis unit 7 are disposed to face each other with the screen unit 1 interposed therebetween, the rotation axis units 7 are disposed so that the line connecting each of the rotation axis units 7 is generally parallel to the fold axis for the bridge unit 3 and the operation unit 2.

The connection unit 6 is disposed between the two support units 5 that sandwich the screen unit 1, and is connected to the support unit 5. The support unit 5 and the connection unit 6 may be integrally formed. Moreover, the connection unit 6 is connected to the operation unit 2 using a hinge and enables folding the operation unit 2 and the bridge unit 3.

As described above, by the screen unit 1 being connected only to the rotation axis unit 7, the screen unit 1 can perform a rotation operation around the rotation axis unit 7. Further, the screen unit 1 is anchored to the bridge unit 3 by anchoring the screen unit 1 to the anchor unit 4 that is disposed at the upper part of the connection unit 6.

Figure 3:
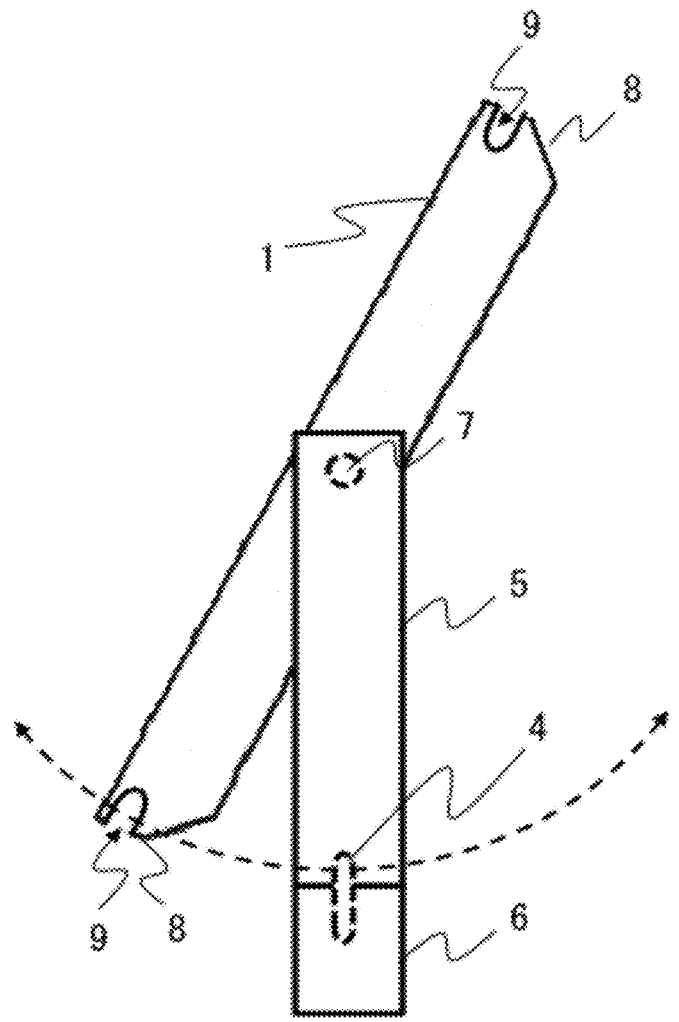
FIG. 3 is a block diagram of a screen unit 1 according to the first exemplary embodiment.

Next, a configuration example of the screen unit 1 according to the first exemplary embodiment of the present invention is explained using FIG. 3. FIG. 3 is a view of the mobile phone terminal in FIG. 1 from the side surface direction. Note that for convenience of the explanation, the anchor unit 4 and the rotation axis unit 7 that are disposed on the back of the bridge unit 3 are indicated using by the dotted line. Additionally, the anchor unit 4 is provided on the corner part of the U-shaped bridge unit 3 which is on the circumference of the circle where the screen unit 1 rotates. The arrow in the drawing indicates the rotation path for the screen unit 1. The screen unit 1 includes an inclined part 8 and a storage part 9. The inclined part 8 is a surface in which a boundary between the upper surface and the lower surface of the housing in the screen unit 1 and at least one surface of the surface and the back surface is formed in an inclined form. Although the inclined part 8 is formed to one of the surface and the back surface of the housing for the screen unit 1 in FIG. 3, the inclined part 8 may be formed to both the surface and the back surface. The upper surface and the lower surface are different surfaces from the side surface to which the screen unit 1 and the rotation axis unit 7 are connected, the surface including the screen unit 1, and the back surface. A recessed part is formed in the storage part 9 so as to store the anchor unit 4 explained below.

The anchor unit 4 is formed in a projected form. The anchor unit 4 is stored inside the connection unit 6, and a part thereof is projected outside the connection unit 6. As the part being projected outside the anchor unit 4 is stored to the storage part 9, the screen unit 1 is anchored to the bridge unit 3.

Figure 4:
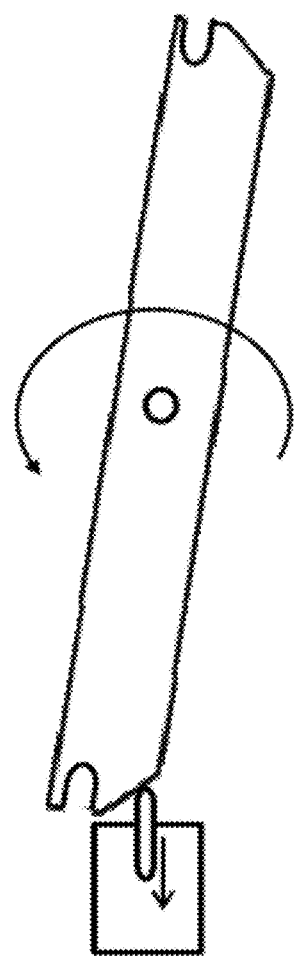
FIG. 4 is a view showing an operation of the screen unit 1 according to the first exemplary embodiment.
Figure 5:
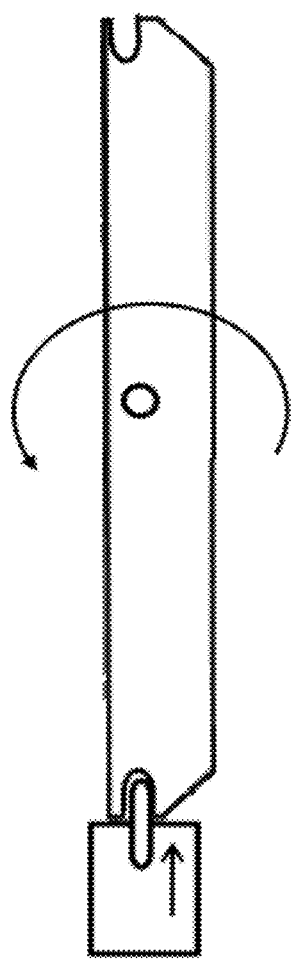
FIG. 5 is a view showing an operation of the screen unit 1 according to the first exemplary embodiment.

Next, the rotation operation of the screen unit 1 is explained using FIG. 4, and an anchor operation of the screen unit 1 is explained using FIG. 5. The curved arrow in FIG. 4 indicates the direction for the screen unit 1 to rotate around the rotation axis 7. When the screen unit 1 rotates, the inclined part 8 and the anchor unit 4 contact. The inclined part 8 is formed in an inclined form. Therefore, when the screen unit 1 moves in the direction of rotation after the inclined part 8 and the anchor unit 4 contact, the anchor unit 4 is depressed towards the straight arrow direction inside the connection unit 6 along the surface of the inclined part 8. The screen unit 1 continues the rotation operation while depressing the anchor unit 4 inside the connection unit 6, and after the inclined part 8 passes through the upper part of the anchor unit 4, the anchor unit 4 is released from the pressure of depression inside the connection unit 6. Then, as shown in FIG. 5, the anchor unit 4 operates in the straight arrow direction, and is stored to the storage part 9. The anchor unit 4 is connected using a spring inside the connection unit 6 in order to move inside the connection unit 6 up and down as described above. The screen unit 1 is anchored to the bridge unit 3 by operating in this way. As the screen unit 1 is anchored to the bridge unit 3, the mobile phone terminal can be used in the state that the display screen is anchored in the normal usage mode of the mobile phone terminal. Further, the anchor unit 4 can prevent unnecessary rotation of the screen unit 1.

Figure 6:
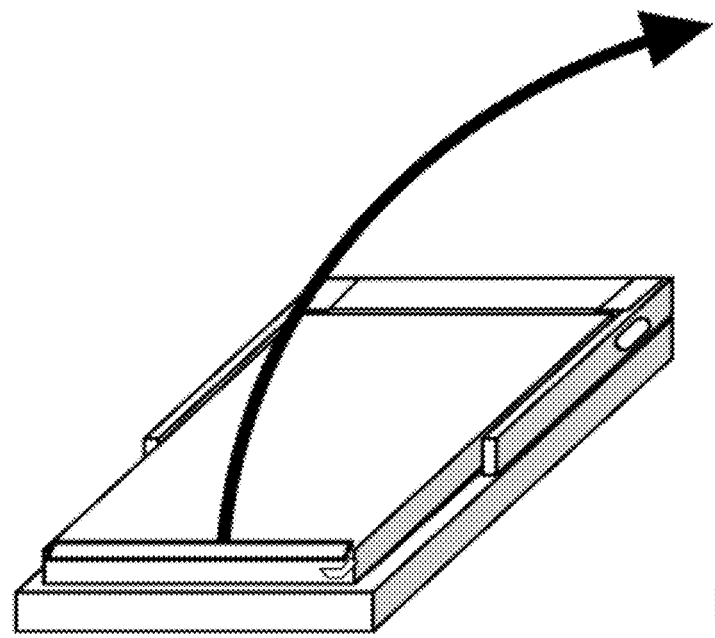
FIG. 6 is a view showing an operation of opening the mobile phone terminal according the first exemplary embodiment.
Figure 7:
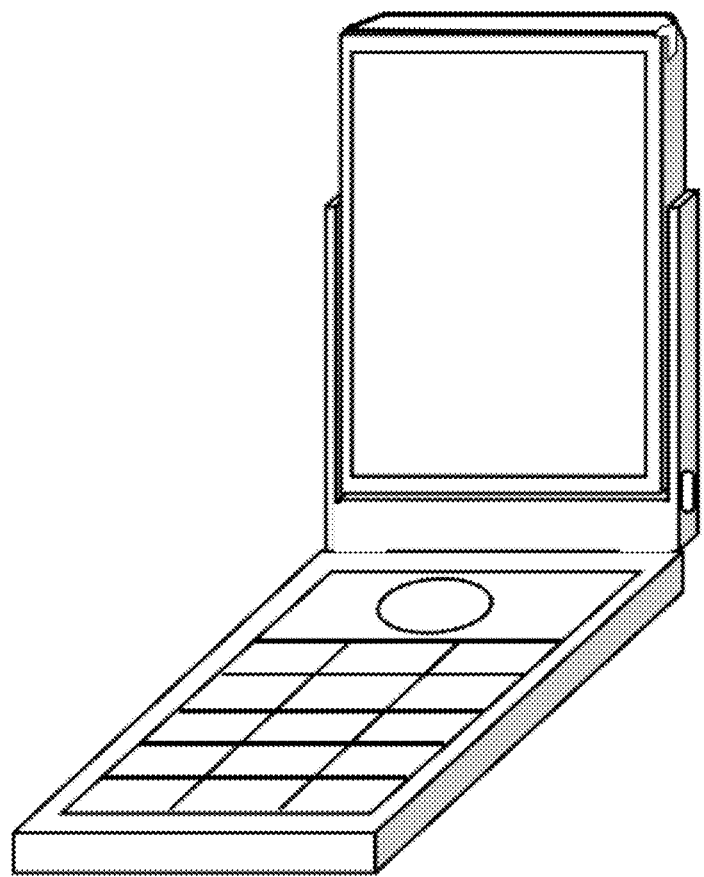
FIG. 7 is a view showing the operation of opening the mobile phone terminal according the first exemplary embodiment.
Figure 8:
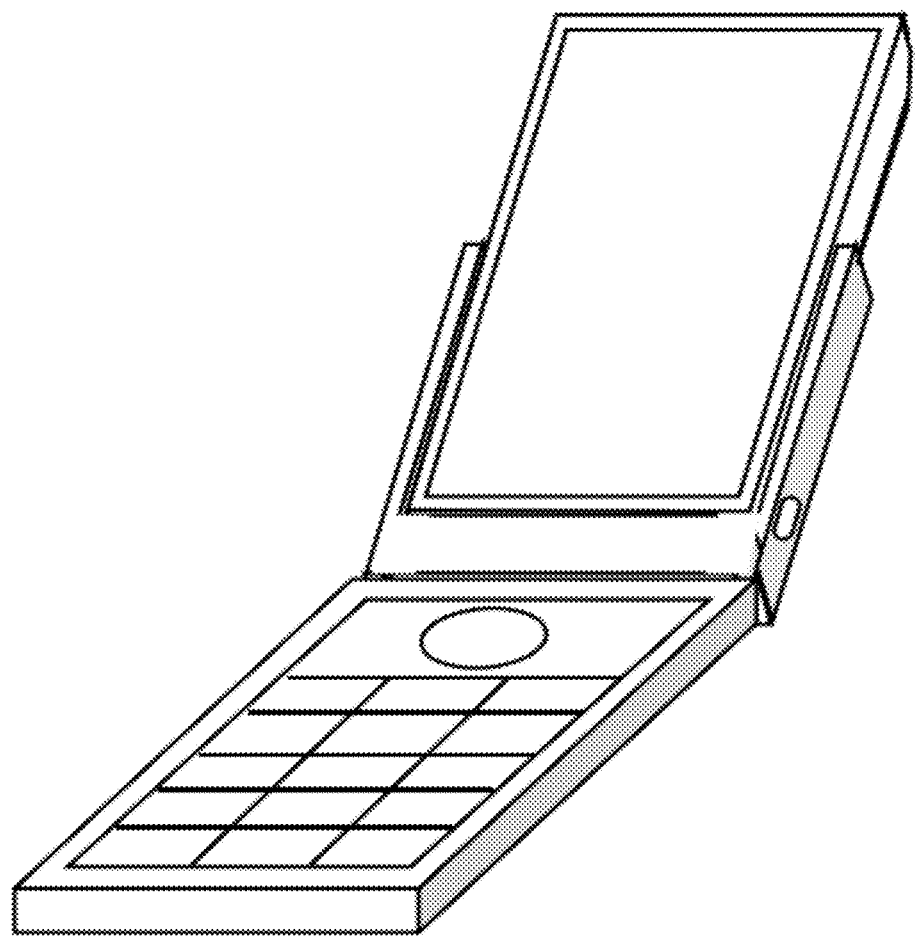
FIG. 8 is a view showing the operation of opening the mobile phone terminal according the first exemplary embodiment.

Next, an operation of opening the mobile phone terminal according to the first exemplary embodiment of the present invention is explained using FIGS. 6 to 8. First, the mobile phone terminal is closed so that the display screen in the screen unit 1 faces the operation unit 2 (FIG. 6). The screen unit 1 is opened at this state, and transitions to the state shown in FIG. 7 and then to the normal usage state shown in FIG. 8. In FIGS. 6 to 8, the operation of opening the mobile phone terminal is performed while the screen unit 1 is anchored to the bridge unit 3.

Figure 9:
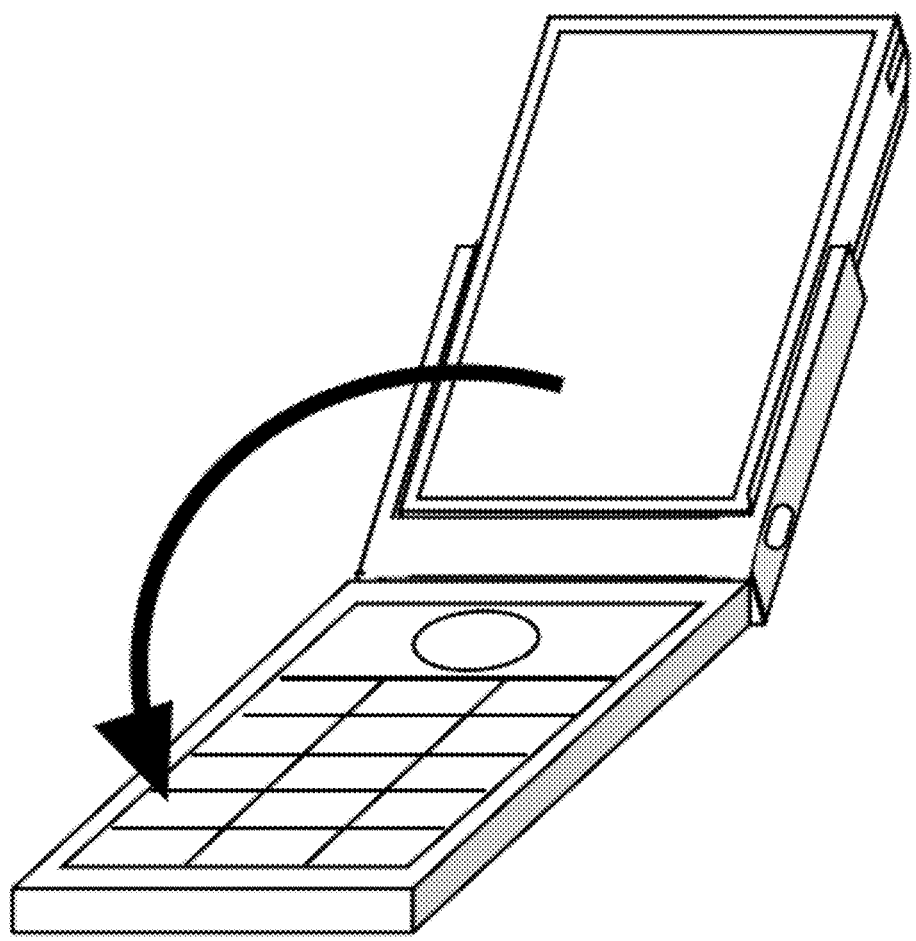
FIG. 9 is a view showing an operation of closing the mobile phone terminal according the first exemplary embodiment.
Figure 10:
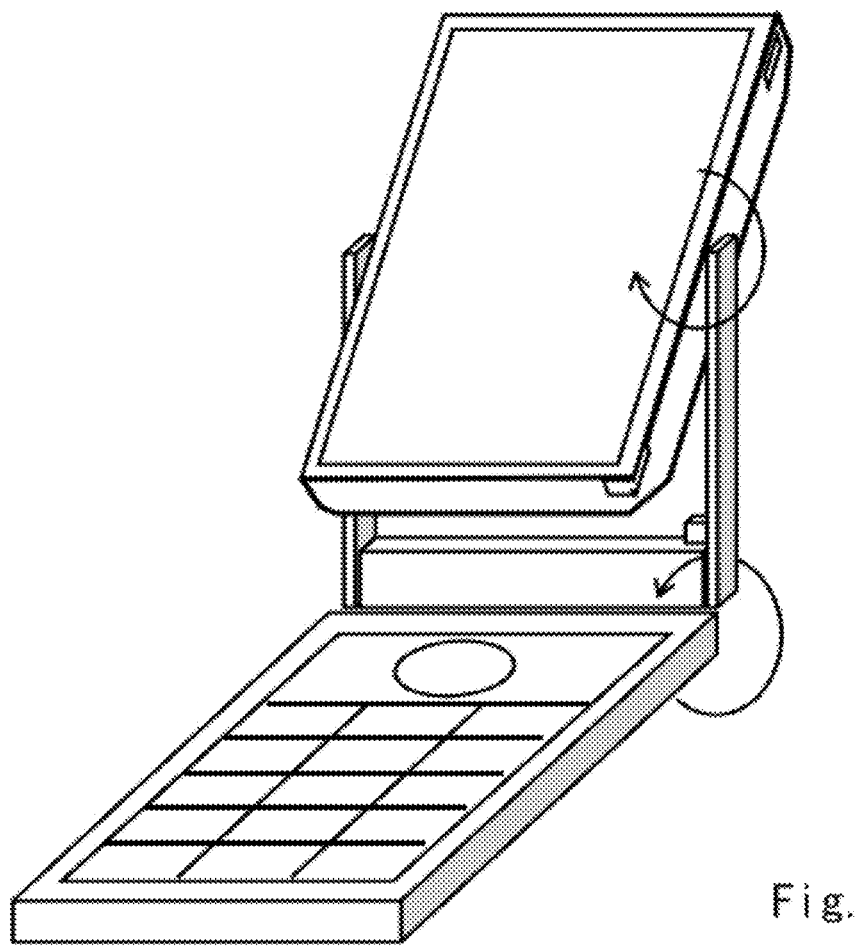
FIG. 10 is a view showing the operation of closing the mobile phone terminal according the first exemplary embodiment.
Figure 11:
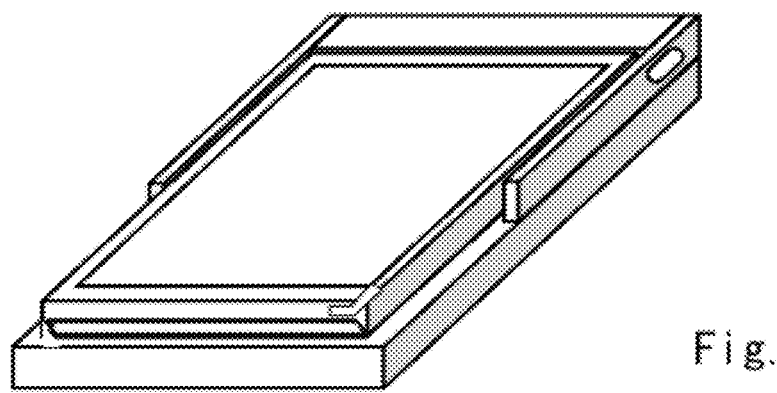
FIG. 11 is a view showing the operation of closing the mobile phone terminal according the first exemplary embodiment.

Next, an operation of closing the mobile phone terminal according to the first exemplary embodiment of the present invention is explained using FIGS. 9 to 11. In the mobile phone terminal of FIG. 9, in order to enable the operation of the operation unit 2 while viewing the display screen of the screen unit 1, the screen unit 1 is anchored to the bridge unit 3 so that the operation button and the display screen face each other when the mobile phone terminal is folded. When the screen unit 1 is closed in the direction of arrow, as shown in FIG. 10, the screen unit 1 is rotated around the connection part (the rotation axis unit 7) with the bridge unit 3 in the opposite direction to the direction in which the bridge unit 3 is folded. By simultaneously performing the folding operation of the bridge unit 3 and the rotation operation of the screen unit 1, as shown in FIG. 11, the folding operation of the bridge unit 3 is completed while the screen unit 1 is anchored to the bridge unit. Such an operation allows the screen unit 1 to integrate the rotation operation of the screen unit 1 and the folding operation of the bridge unit 3 into a series of operations. Further, the screen unit 1 is anchored to the bridge unit 3 in the process of folding the operation unit 2 and the bridge unit 3.

Figure 12:
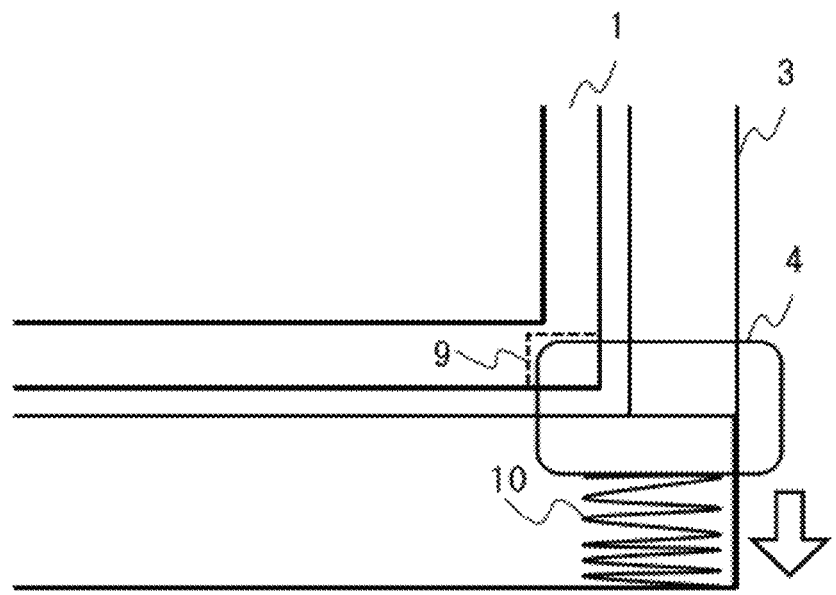
FIG. 12 is a view showing an operation of releasing a screen unit according the first exemplary embodiment.
Figure 13:
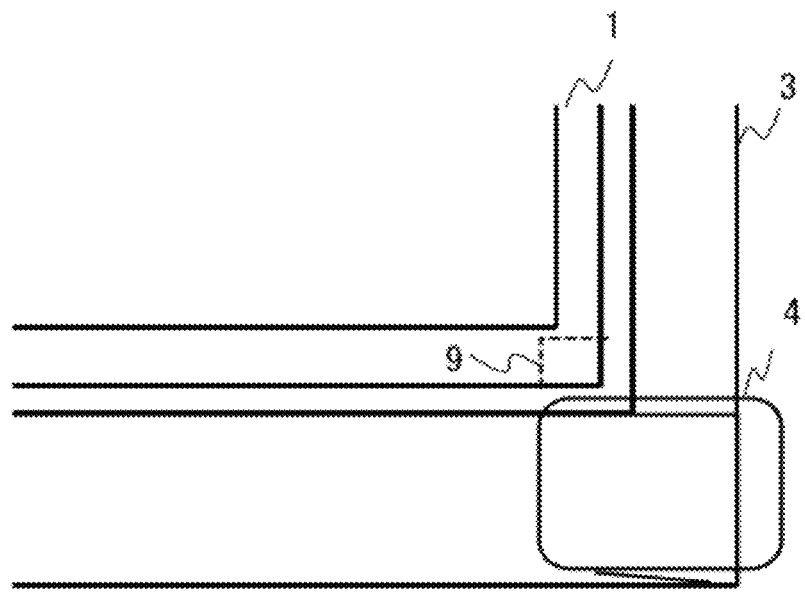
FIG. 13 is a view showing the operation of releasing the screen unit according the first exemplary embodiment.

Next, an operation of releasing the screen unit 1 in the anchored state according to the first exemplary embodiment of the present invention is explained using FIGS. 12 and 13. In FIG. 12, the part of the anchor unit 4 that is projected outside the bridge unit 3 is anchored to the storage part 9 of the screen unit 1. Moreover, a spring 10 is disposed inside the bridge unit 3, and the part of the anchor unit 4 that is pushed inside the bridge unit 3 is connected to the spring 10. This enables the anchor unit 4 to operate in the vertical direction. In addition, the part of the anchor unit 4 is projected from the side surface of the bridge unit 3, and a person who operates the mobile phone terminal can move the anchor unit 4 in the vertical direction using the projected part.

In the state that the anchor unit 4 is stored to the storage part 9 and the screen unit 1 is anchored to the bridge unit 3, by depressing the anchor unit 4 downward, the anchored state of the screen unit 1 and the bridge unit 3 is released. Then, the screen unit 1 can perform the rotation operation.

Second Exemplary Embodiment

Figure 14:
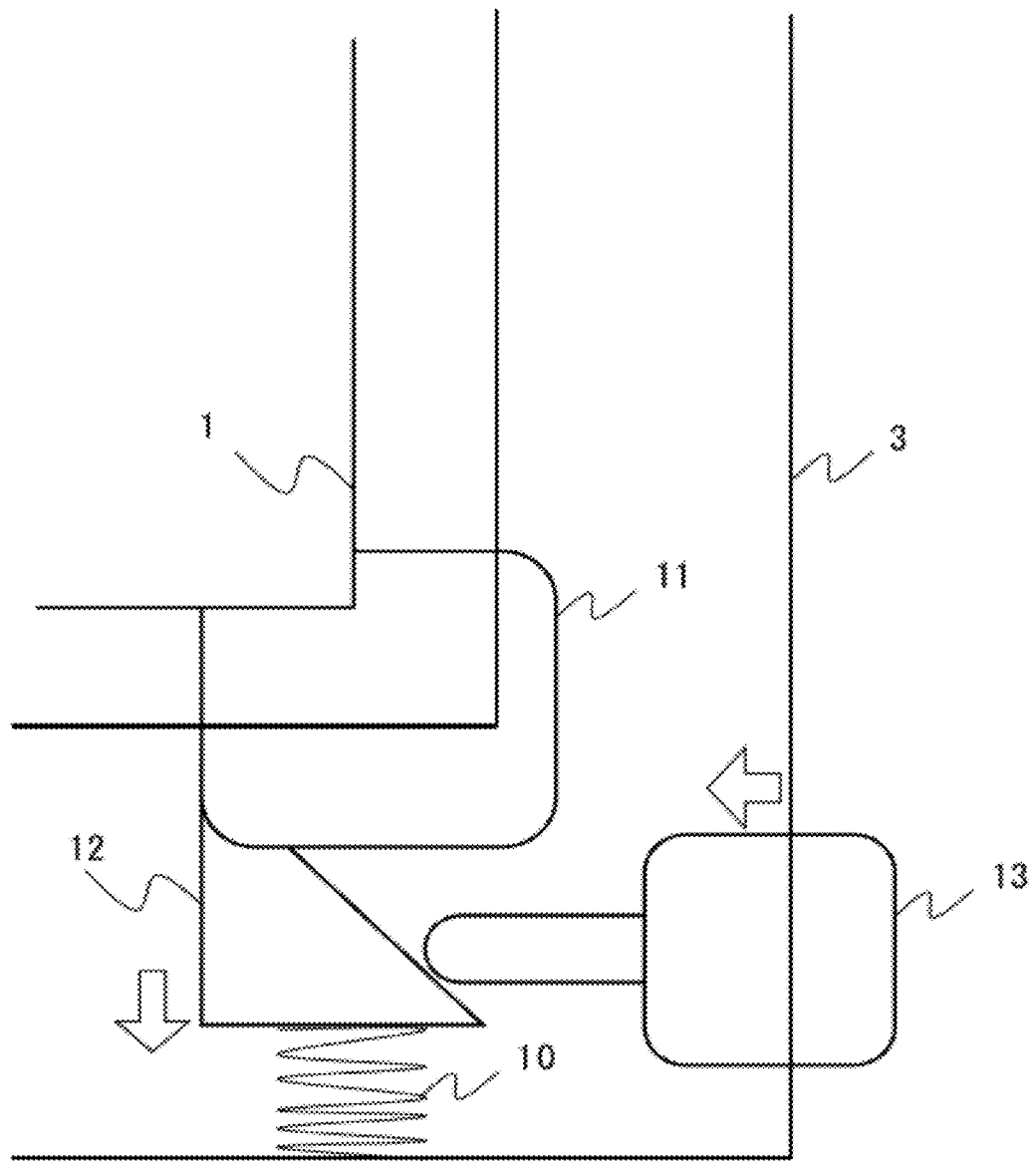
FIG. 14 is a view showing an operation of releasing a screen unit according a second exemplary embodiment.
Figure 15:
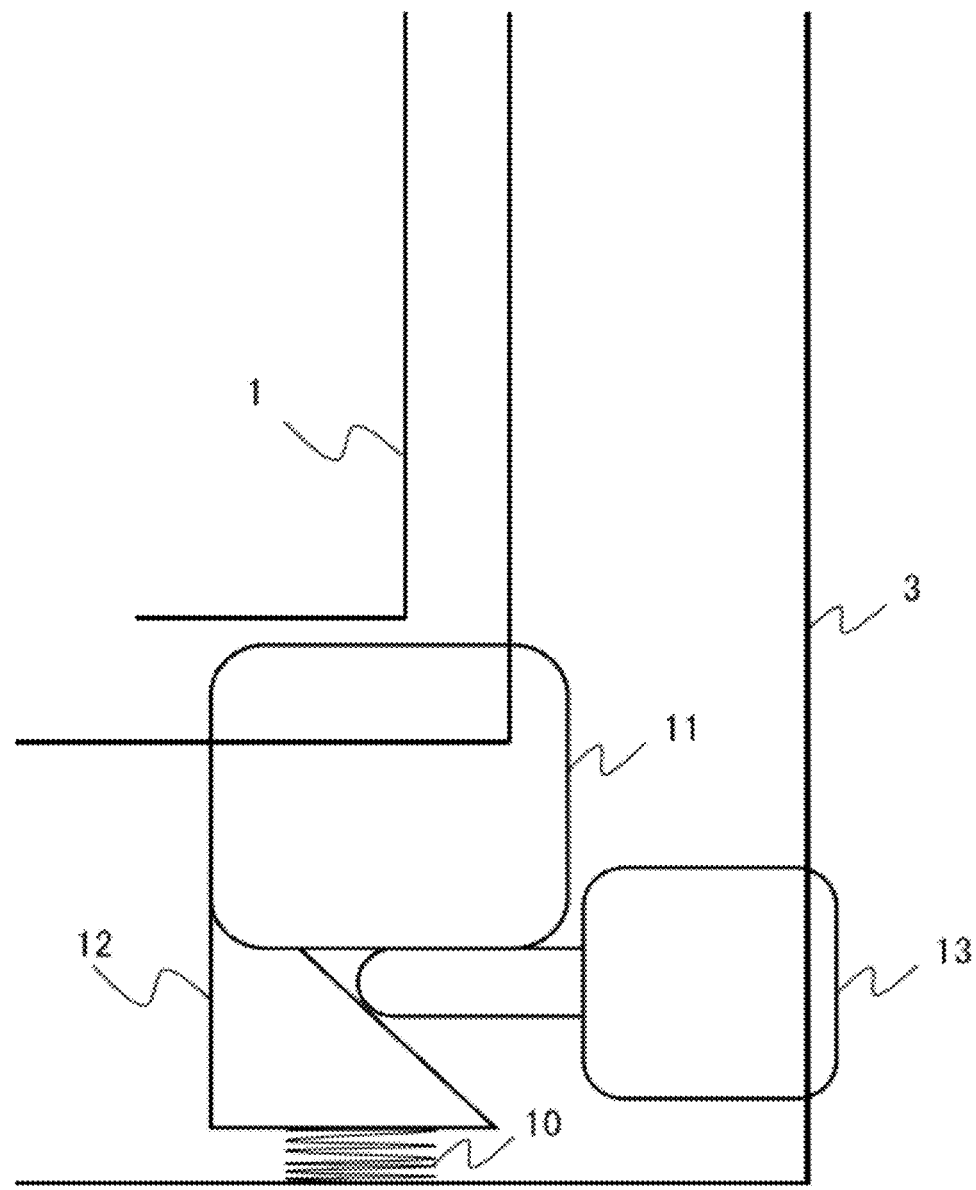
FIG. 15 is a view showing the operation of releasing the screen unit according the second exemplary embodiment.

Next, an operation of releasing the screen unit 1 in the anchored state according to a second exemplary embodiment is explained using FIGS. 14 and 15. As the operation of the screen unit 1 to rotate and the operation of being anchored to the bridge unit 3 are same as the first exemplary embodiment, the explanation is omitted. Additionally, since the configuration of the screen unit 1 is also similar to the first exemplary embodiment, the explanation is omitted. The anchor unit 4 includes an upper anchor unit 11, a lower anchor unit 12, and a button unit 13. The upper anchor unit 11 and the lower anchor unit 12 are connected, and the lower anchor unit 12 is connected to the spring 10. The upper anchor unit 11 is provided on the screen unit 1 side, and is stored to the storage part 9. The lower anchor unit 12 includes an inclined part that slopes toward the corner part of the bridge unit 3 formed in the U-shape.

While the upper anchor unit 11 and the lower anchor unit 12 operate in the vertical direction by expansion and contraction of the spring 10, the button unit 13 operates in the horizontal direction so as to depress the inclined part of the lower anchor unit 12. In FIG. 14, when the button unit 13 depresses the inclined part of the lower anchor unit 12, the lower anchor unit 12 is depressed while the button unit 13 moves in the direction of climbing the inclined surface along the inclined surface. That is, the lower anchor unit 12 operates in the direction that contracts the spring 10. Then, as shown in FIG. 15, the upper anchor unit 11 comes off from the storage part 9, the anchored state of the upper anchor unit 11 and the screen unit 1 is released, and thereby making the screen unit 1 be in the rotatable state. In this way, the anchor unit 4 explained in FIGS. 14 and 15 enables the upper anchor unit 11 and the lower anchor 12 to operate in the vertical direction against the pressure applied in the horizontal direction using the button unit 13, and thus the anchored state of the screen unit 1 and the bridge unit 3 can be released.

Third Exemplary Embodiment

Figure 16:
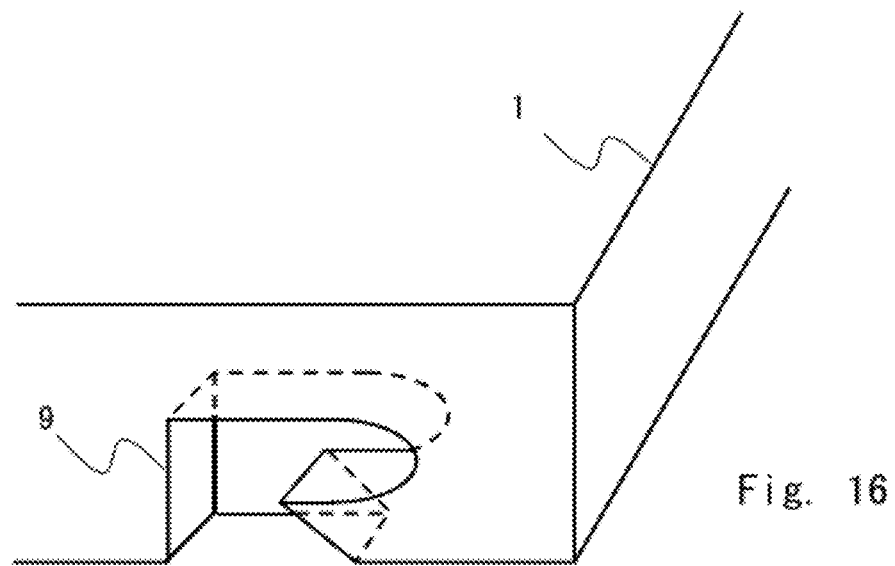
FIG. 16 is a view showing an operation of releasing a screen unit according a third exemplary embodiment.
Figure 17:
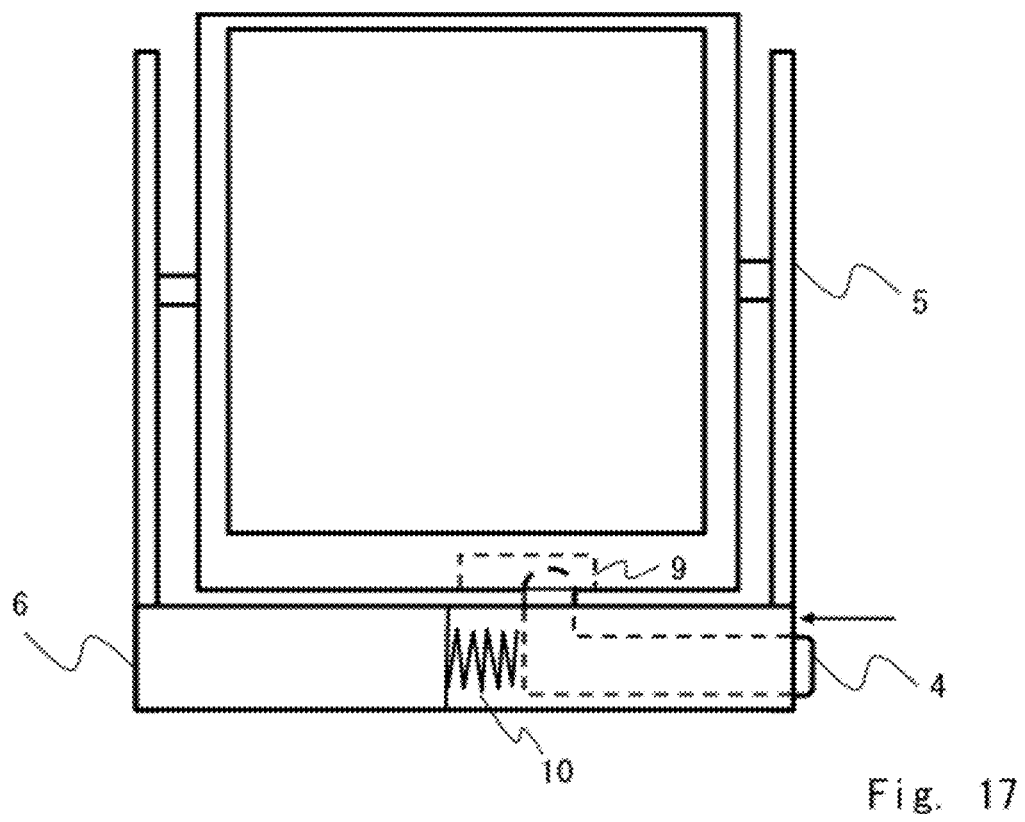
FIG. 17 is a view showing the operation of releasing the screen unit according the third exemplary embodiment.
Figure 18:
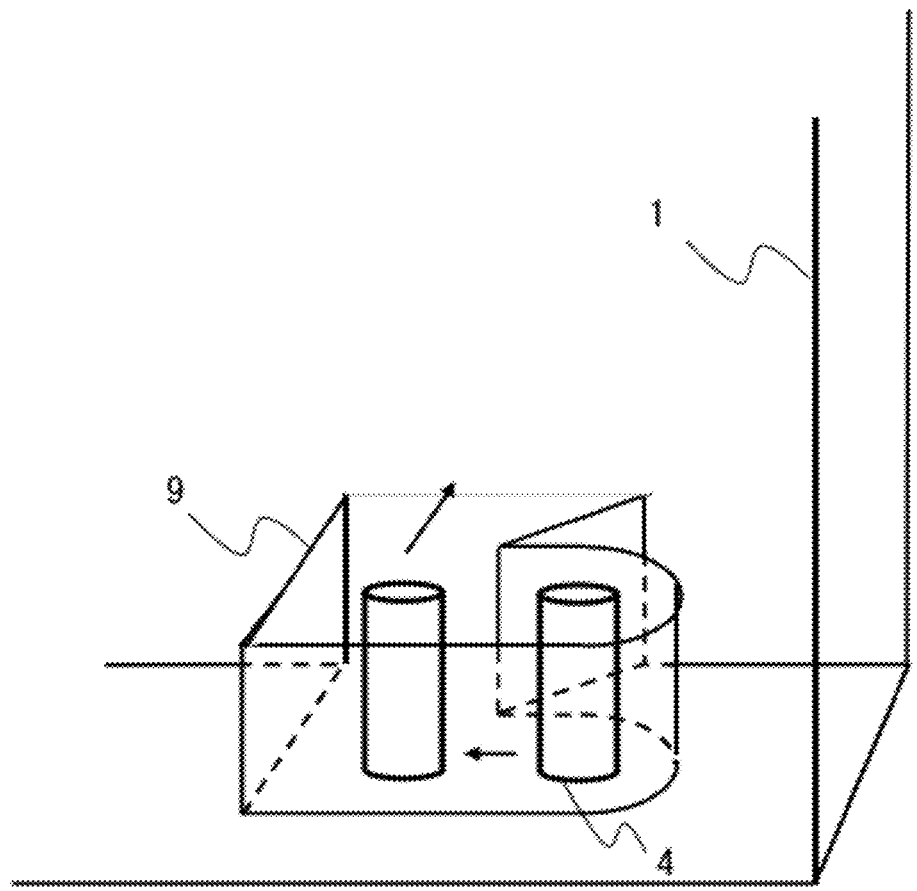
FIG. 18 is a view showing the operation of releasing the screen unit according the third exemplary embodiment.

Next, an operation of releasing the screen unit 1, which is in the anchored state, according to a third exemplary embodiment of the present invention is explained using FIGS. 16 to 18. As the operation of the screen unit 1 to rotate and the operation of being anchored to the bridge unit 3 are same as the first exemplary embodiment, the explanation is omitted. Moreover, since the configuration of the screen unit 1 is also similar to the first exemplary embodiment, the explanation is omitted. FIG. 16 shows the form of the storage part 9 in the screen unit 1. The storage part 9 is formed to the upper surface and the lower surface of the screen unit 1. The storage part 9 formed to the upper surface and the lower surface is composed of a recessed part extending in the side surface direction of the screen unit 1 and a recessed part extending on the surface or the back surface of the housing. The recessed part extended on the surface or the back surface of the housing includes an open end on at least one of the surface and the back surface of the housing.

Next, the operation of releasing the screen unit 1 in the anchored state is explained using FIGS. 17 and 18. FIG. 17 shows the state in which the screen unit 1 is anchored to the bridge unit 3. The screen unit 1 is anchored to the bridge unit 3 as the anchor unit 4 is stored to the storage part 9. The anchor unit 4 includes parts that are projected respectively on the side surface and the upper surface of the connection unit 6. Depressing the part that is projected on the side surface of the connection unit 6 in the inside direction of the connection unit 6 (left direction in FIG. 17) moves the part that is projected on the upper surface in the same direction inside the storage part 9. Moreover, the anchor unit 4 is anchored inside the connection unit 6 using the spring 10. When the anchor unit 4 comes off, the anchor unit 4 moves in the opposite direction to the direction in which the anchor unit 4 is depressed by the action of the spring 10.

FIG. 18 shows the operating state of the anchor unit 4 inside the storage part 9. In the state that the spring 10 is expanded, the anchor unit 4 is anchored inside the storage part 9. When the anchor unit 4 is depressed at this state to contract the spring 10, the anchor unit 4 stored to the storage part 9 moves in the depressed direction. Then, the anchor unit 4 moves outside the storage part 9 via the open end of the storage part 9. Accordingly, the screen unit 1 is released and can rotate around the rotation axis unit 7. Although an example is explained here in which a groove formed in the screen unit 1 shown in FIGS. 16 to 18 has the open end on either one of the surface and the back surface of the housing, both the surface and the back surface may have the open end. The open end included in both the surface and the back surface enables the screen unit 1 to rotate in both directions of right and left rotation, instead of either one of right rotation and left rotation, and the screen unit 1 can be released from the bridge unit 3.

As explained above, the mobile phone terminal according to the first exemplary embodiment of the present invention achieves the operation of folding the mobile phone terminal and the operation of rotating the screen unit by a series of operations. Therefore, the screen unit and the bridge unit can be anchored while the folding operation of the mobile phone terminal is completed.

Further, as the screen unit is anchored to the anchored unit, the screen can be anchored and used in the normal usage state.

Furthermore, connecting the anchor unit to the bridge unit 3 using the spring allows the screen unit 1 to be released from the bridge unit 3 by a simple operation.

Note that the present invention is not limited to the above exemplary embodiments, but can be modified as appropriate without departing from the scope.

Although the present invention is explained with reference to the exemplary embodiments, the present invention is not limited by above. Various modifications that can be understood by those who skilled in the art within the scope of the present invention can be made to the configuration and details of the present invention.

This application claims the priority on the basis of the Japanese application for patent 2010-017022 for which it applied on Jan. 28, 2010, and takes in those the indications of all here.

REFERENCE SIGNS LIST

1 SCREEN UNIT
2 OPERATION UNIT
3 BRIDGE UNIT
4 ANCHOR UNIT
5 SUPPORT UNIT
6 CONNECTION UNIT
7 ROTATION AXIS UNIT
8 INCLINED PART
9 STORAGE PART
10 SPRING
11 UPPER ANCHOR UNIT
12 LOWER ANCHOR UNIT
13 BUTTON UNIT

The invention claimed is:

1. A portable electronic apparatus, comprising:
a generally rectangular first housing;
a generally rectangular second housing;
a U-shaped bridge unit that rotatably connects the second housing and is connected to the first housing so that the second housing and the first housing can be folded to face each other; and
an anchor unit that anchors the second housing to the bridge unit while stopping rotation of the second housing,
wherein the second housing is connected to the bridge unit so as to rotate around an axis that is in a generally same direction as a fold axis for the first housing and the bridge unit,
wherein the anchor unit is disposed on a corner part of the U-shaped bridge unit and anchors at least one corner part of the generally rectangular second housing that performs a rotation operation,
wherein the second housing includes a storage part with a recessed part formed therein for storing the anchor unit,
wherein the storage part is formed to a surface that faces the connection unit,
wherein the anchor unit is provided on the corner part of the U-shaped bridge unit and anchors at least one corner part of the generally rectangular second housing that performs the rotation operation, and comprises:
an upper anchor unit that is disposed on the second housing side stored to the storage unit,
a lower anchor unit that is disposed between a spring disposed in the connection unit and the upper anchor unit, and includes an inclined part that slopes toward the corner part of the U-shaped bridge, and
a button unit that depresses the upper anchor unit together with the lower anchor unit by depressing the inclined part,
and
wherein the lower anchor unit is depressed together with the spring by the button unit depressing the inclined part and moving along an inclined surface, the upper anchor unit comes off from the storage unit, and thereby making the second housing be in a rotatable state.

2. The portable electronic apparatus according to claim 1, wherein
the second housing comprises the inclined part that contacts the anchor unit before the storage part, and
the anchor unit is depressed inside the bridge unit along the inclined surface of the inclined part by the rotation operation of the second housing, and after the anchor unit passes through the inclined part, the anchor unit is released from pressure of depression inside the bridge and stored to the storage part, and then the second housing is anchored to the bridge unit.

3. A portable electronic apparatus, comprising:
a generally rectangular first housing;
a generally rectangular second housing;

a U-shaped bridge unit that rotatably connects the second housing and is connected to the first housing so that the second housing and the first housing can be folded to face each other; and an anchor unit that anchors the second housing to the bridge unit while stopping rotation of the second housing, wherein the second housing is connected to the bridge unit so as to rotate around an axis that is in a generally same direction as a fold axis for the first housing and the bridge unit, wherein the anchor unit is disposed on a corner part of the U-shaped bridge unit and anchors at least one corner part of the generally rectangular second housing that performs a rotation operation, wherein the second housing includes a storage part with a recessed part formed therein for storing the anchor unit, wherein the second housing comprises the inclined part that contacts the anchor unit before the storage part, and wherein the anchor unit is depressed inside the bridge unit along the inclined surface of the inclined part by the rotation operation of the second housing, and after the anchor unit passes through the inclined part, the anchor unit is released from pressure of depression inside the bridge and stored to the storage part, and then the second housing is anchored to the bridge unit.

4. A portable electronic apparatus, comprising:

a generally rectangular first housing;

a generally rectangular second housing;

a U-shaped bridge unit that rotatably connects the second housing and is connected to the first housing so that the second housing and the first housing can be folded to face each other; and an anchor unit that anchors the second housing to the bridge unit while stopping rotation of the second housing, wherein the second housing is connected to the bridge unit so as to rotate around an axis that is in a generally same direction as a fold axis for the first housing and the bridge unit, wherein the anchor unit is disposed on a corner part of the U-shaped bridge unit and anchors at least one corner part of the generally rectangular second housing that performs a rotation operation, wherein the bridge unit comprises:

first and second support units that are disposed to face each other with the second housing interposed therebetween, and a connection unit that is connected to the first housing while anchoring between the first and the second support units that are disposed to face each other with the second housing interposed therebetween, the second housing being rotatably connected to the first and the second support units by a rotation axis unit provided to a generally central part of the second housing, wherein the second housing comprises the inclined part that contacts the anchor unit before the storage part, and wherein the anchor unit is depressed inside the bridge unit along the inclined surface of the inclined part by the rotation operation of the second housing, and after the anchor unit passes through the inclined part, the anchor unit is released from pressure of depression inside the bridge and stored to the storage part, and then the second housing is anchored to the bridge unit.

* * * * *